(12) United States Patent
Darr

(10) Patent No.: US 7,279,207 B2
(45) Date of Patent: Oct. 9, 2007

(54) PLASTIC PREFORM WITH STEPPED NECK FINISH

(75) Inventor: Richard C. Darr, Medina, OH (US)

(73) Assignee: Plastipak Packaging, Inc., Plymouth, MI (US)

( * ) Notice: Subject to any disclaimer, the term of this patent is extended or adjusted under 35 U.S.C. 154(b) by 33 days.

(21) Appl. No.: 11/179,164

(22) Filed: Jul. 12, 2005

(65) Prior Publication Data

US 2005/0258127 A1 Nov. 24, 2005

Related U.S. Application Data

(63) Continuation of application No. 10/734,350, filed on Dec. 12, 2003, now Pat. No. 6,971,530.

(51) Int. Cl.
*B65D 1/02* (2006.01)
(52) U.S. Cl. ............... 428/36.9; 428/35.7; 428/542.8; 215/40
(58) Field of Classification Search ............... 428/35, 428/7, 542.8, 36.92; 215/40, 43, 45, 232; 220/359.1
See application file for complete search history.

(56) References Cited

U.S. PATENT DOCUMENTS

| | | | | |
|---|---|---|---|---|
| 3,961,113 A | * | 6/1976 | Marco | 428/36.92 |
| 4,005,245 A | * | 1/1977 | Edwards | 428/542.8 |
| 4,463,056 A | * | 7/1984 | Steele | 428/542.8 |
| 4,496,064 A | * | 1/1985 | Beck et al. | 215/43 |
| 4,649,068 A | * | 3/1987 | Collette | 428/36.92 |
| 6,068,811 A | * | 5/2000 | Koda | 264/537 |
| 6,079,579 A | * | 6/2000 | De Cuyper | 215/41 |
| 6,641,881 B1 | * | 11/2003 | Darr | 428/35.7 |

FOREIGN PATENT DOCUMENTS

| | | | |
|---|---|---|---|
| JP | 11245941 | * | 9/1999 |
| JP | 2004 268570 | * | 9/2004 |
| WO | WO 97/22520 | * | 6/1997 |

* cited by examiner

*Primary Examiner*—Sue A. Weaver
(74) *Attorney, Agent, or Firm*—Robert H. Bachman

(57) ABSTRACT

The improved plastic container and preform is light weight and includes a base, a cylindrical sidewall projecting upwardly from the base, and a neck finish projecting upwardly from the sidewall and having an opening to the inside of the container. The neck finish includes an inwardly oriented stepped area adjacent the opening.

13 Claims, 4 Drawing Sheets

PLASTIC PREFORM WITH STEPPED NECK FINISH

CROSS-REFERENCE TO RELATED APPLICATION

This application is a continuation of U.S. patent application Ser. No. 10/734,350, filed Dec. 12, 2003, U.S. Pat. No. 6,971,530.

BACKGROUND OF THE INVENTION

It is highly desirable to provide a light weight plastic container and preform for forming same.

Conventionally, the neck finish on plastic containers, as polyethylene terephthalate (PET), has a threaded or snap-on area with an intermediate, outwardly extending support flange. The support flange is used as a feature to enable one to transfer preforms into a blow mold and to enable one to remove the blown container out of the blow mold, for example, on a high speed, two stage blow molding machine.

However, this neck finish requires 3 to 4 grams of plastic and adds considerably to the overall weight of the preform and the final container.

It would be highly desirable to simplify and light weight these structures, especially with an improved configuration which enables simpler and more convenient handling in the overall process cycle.

It would also be advantageous to provide a light weight container and preform which would enable more rapid cycle times and cost reduction. It would be further advantageous to provide such a container which is recyclable.

Further objectives of the present invention will appear hereinbelow.

SUMMARY OF THE PRESENT INVENTION

In accordance with the present invention the foregoing objects and advantages are readily achieved.

The improved container of the present invention comprises: a blow molded plastic container having a circular base, a cylindrical sidewall projecting upwardly from the base, a neck finish projecting upwardly from the sidewall and having an opening to the inside of the container; wherein the neck finish includes an inwardly oriented, stepped area adjacent said opening. The stepped area desirably includes an upper, outwardly extending flange which borders on the opening and which extends beyond the outward extension of the neck finish.

In the preferred embodiment the neck finish includes the upper, outwardly extending flange having an outer surface and an inner surface, a downwardly extending flange extending downwardly from the inner surface of the outwardly extending flange and having an upper portion connected to the inner surface of the outwardly extending flange and a lower portion opposed to the upper portion, and a lower inwardly extending flange connected to the lower portion of the downwardly extending flange and extending inwardly of the downwardly extending flange.

The opening may be closed by a foil covering and/or a cap.

The sidewall preferably includes a plurality of spaced apart, continuous circumferential grooves extending around the sidewall, for example, at least five grooves. The grooves are separated by raised, generally flat areas. The base preferably has a plurality of outwardly extending struts and a central recessed area.

The preform of the present invention comprises: a base, a cylindrical sidewall projecting upwardly from the base, a neck finish projecting upwardly from the sidewall and having an opening to the inside of the preform; wherein the neck finish includes an inwardly oriented, stepped area adjacent said opening.

The neck finish has the same configuration as in the blow molded container. The sidewall of the preform is substantially straight and projects inwardly of the neck finish. The base of the preform, in cross-section, is semi-circular.

While the present invention can readily be used with any plastic material, it is particularly suitable for PET.

Further features and advantages of the present invention will appear hereinbelow.

BRIEF DESCRIPTION OF THE DRAWINGS

The present invention will be more readily understandable from a consideration of the accompanying, illustrative drawings, wherein.

DETAILED DESCRIPTION OF PREFERRED EMBODIMENTS

Figure 2:
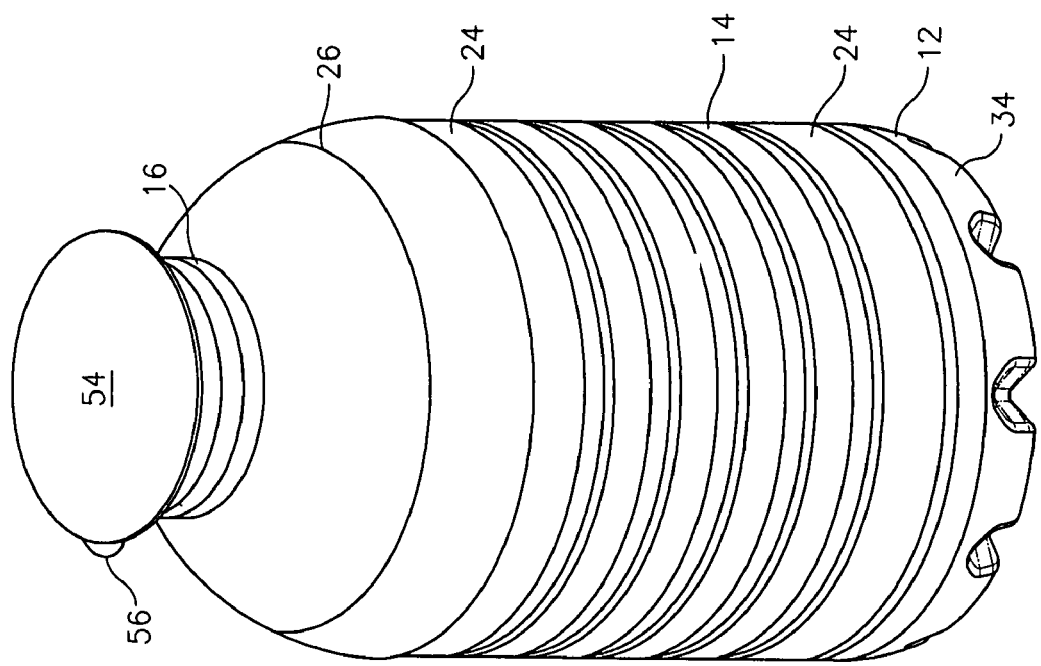
FIG. 2 is a perspective view of the container of FIG. 1.
Figure 1:
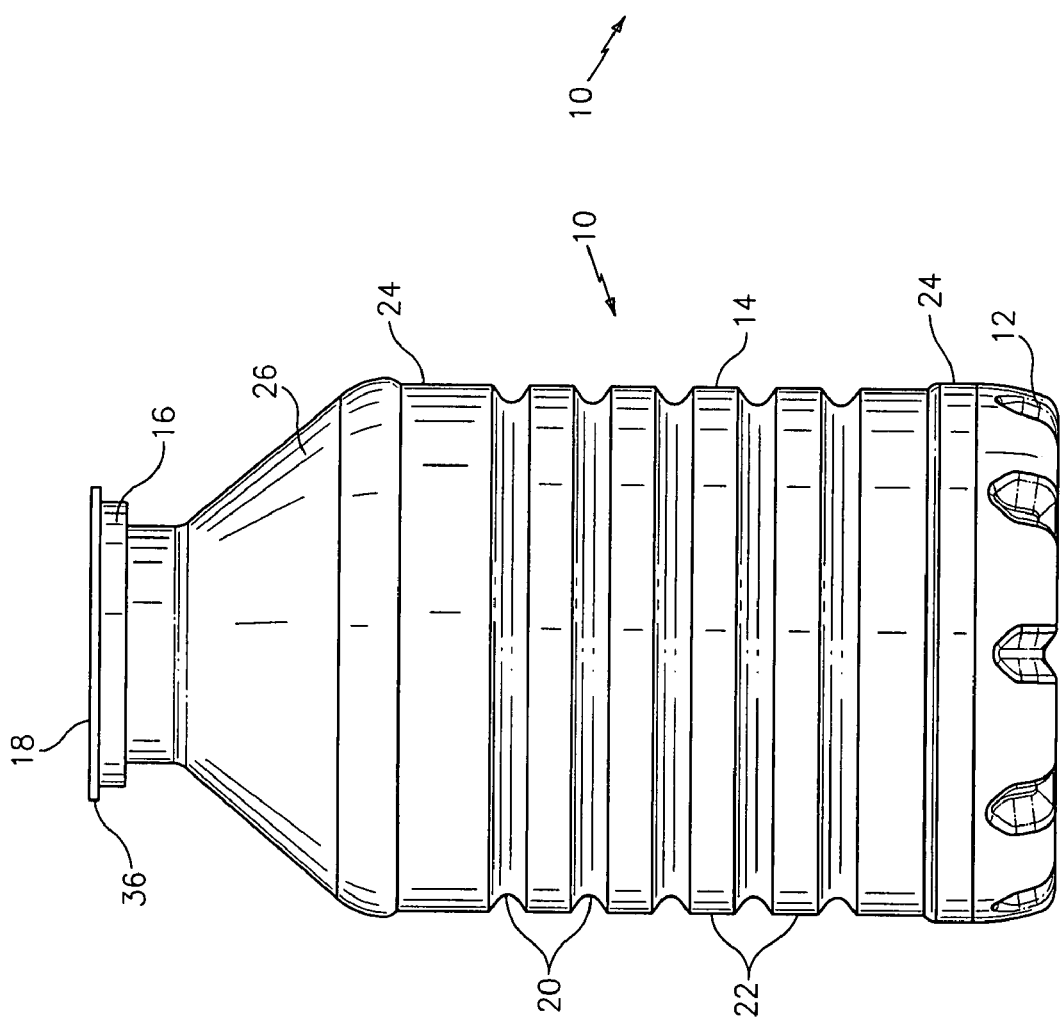
FIG. 1 is a side view of one embodiment of the container of the present invention.

Referring to the drawings, FIGS. 1 and 2 show one embodiment of the container of the present invention, container 10, a 200 ml juice container, which is a blow molded container having a circular base 12, a cylindrical sidewall 14 projecting upwardly from the circular base 12, a neck finish 16 projecting upwardly from the sidewall 14 and having an opening 18 to the inside of the container. The neck finish is shown in more detail in FIG. 4 and the base is shown in more detail in FIG. 3, both of which to be discussed in more detail hereinbelow.

The sidewall 14 advantageously includes a plurality of spaced apart, continuous, circumferential grooves 20, each extending completely around the sidewall and separated by raised, generally flat areas 22. For example, in the embodiment shown in FIGS. 1 & 2, five grooves 20 and four flat areas 22. The grooves and flat areas advantageously provide rigidity to the sidewall, but the exact number will depend on the size and shape of the container. Flat label panels 24 extend above and below the circumferential grooves for attachment of a label thereto.

Shoulder area 26 is provided at the upper end of the sidewall and above the upper label panel, between the uppermost circumferential groove and the neck finish.

Figure 3:
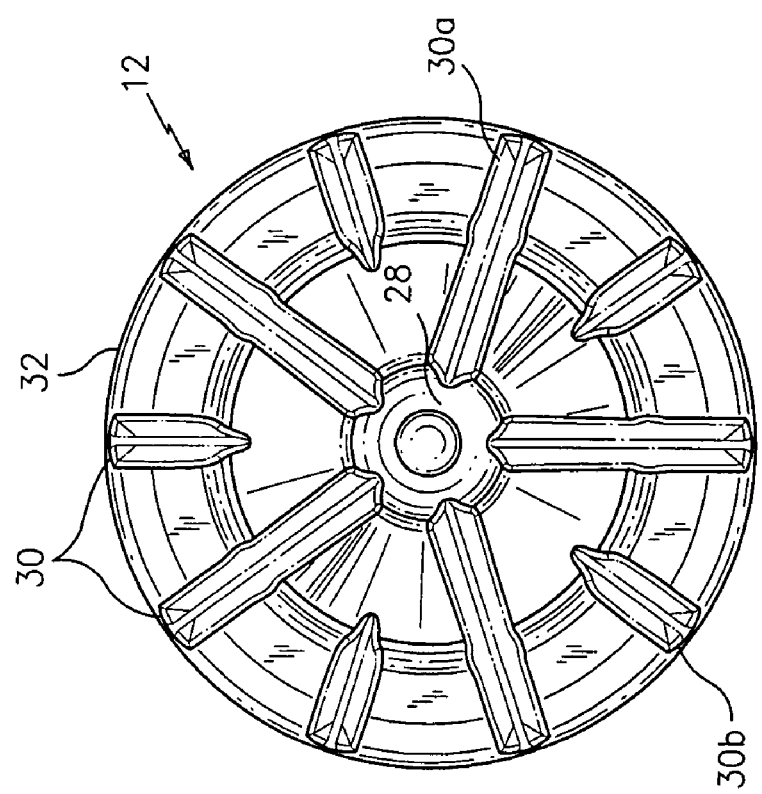
FIG. 3 is a bottom view of the base of the container of FIG. 1.

Base 12, shown in more detail in FIG. 3, desirably includes a central recessed area 28 and a plurality of outwardly extending struts 30 having a curved cross-section. In the embodiment shown in FIG. 3, five struts 30a extend from the edge of 32 of the base 12 to the central recessed area 28, and five shorter struts 30b extend from edge 32 partway to recessed area 28. Also, in the embodiment of FIG. 3 the disposition of the struts is that the shorter struts 30*b* alternate with the longer struts 30*a*. The struts form stable feet 34 as can be clearly seen in FIG. 2, and provide stability to the base.

Figure 4:
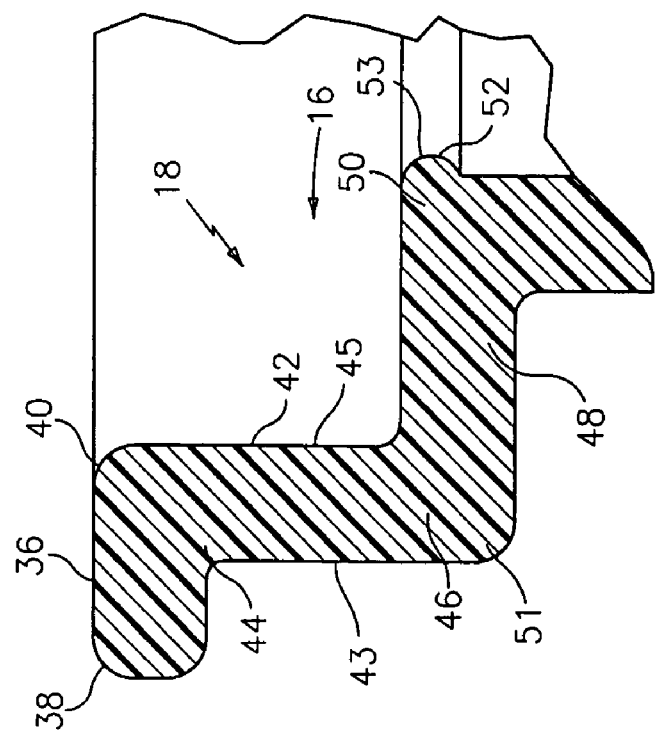
FIG. 4 is a detail view of the neck finish of the container of FIG. 1.

The neck finish area 16 is shown in more detail in FIG. 4. As can be clearly seen in FIG. 4, neck finish 16 includes an inwardly oriented stepped area adjacent opening 18. The stepped area includes an uppermost, outwardly extending flange 36 which borders opening 18. As can be seen in FIG. 1, upper flange 36 extends outward beyond the outward extension of the neck finish 16.

The upper, outwardly extending flange 36 has an outer surface 38 and an inner surface 40. A downwardly extending flange 42 extends downwardly from the inner surface 40 of the outwardly extending flange 36 and includes an upper portion 44 connected to the inner surface 40 of the flange 36 and a lower portion 46 opposed to the upper portion 44.

The downwardly extending flange 42 has an outer surface 43 and an inner surface 45, wherein the outer surface 43 extends essentially perpendicular to the upper flange 36 during the entire length of the downwardly extending flange 42. In addition; the inner surface 45 of the downwardly extending flange 42 extends essentially perpendicular to the upper flange 36 during the entire length of the downwardly extending flange.

In addition, a lower, inwardly extending flange 48 is connected to the lower portion 46 and extends inwardly of the downwardly extending flange 42. Also, the inside surface 50 of flange 48 includes an inward projection 52. Projection 52 is also present in the preform and facilitates holding the preform and the container from the inside during the processing cycle.

The inward projection 52 of flange 48 has an inwardly projecting curved surface 53. The outside surface 51 of the inwardly extending flange 48 terminates at the lower portion 46 of the downwardly extending flange 42. The outside surface 51 of the lower, inwardly extending flange 48 is connected to the outer surface 43 of the downwardly extending flange 42 in an essentially straight line.

Figure 6:
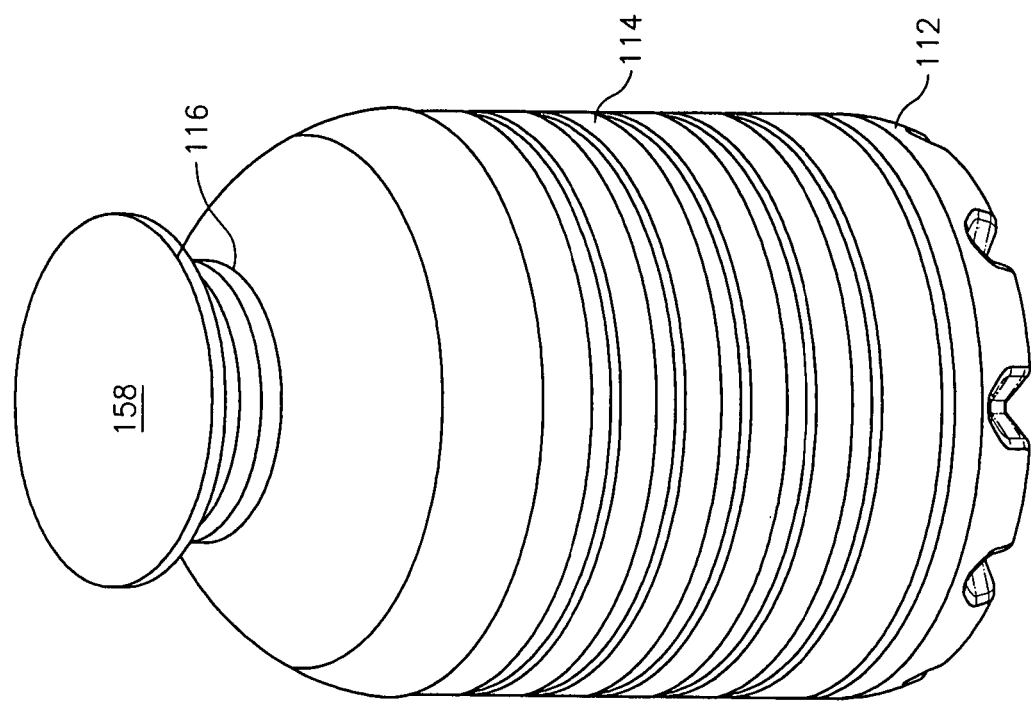
FIG. 6 is a perspective view of the container of FIG. 5.
Figure 5:
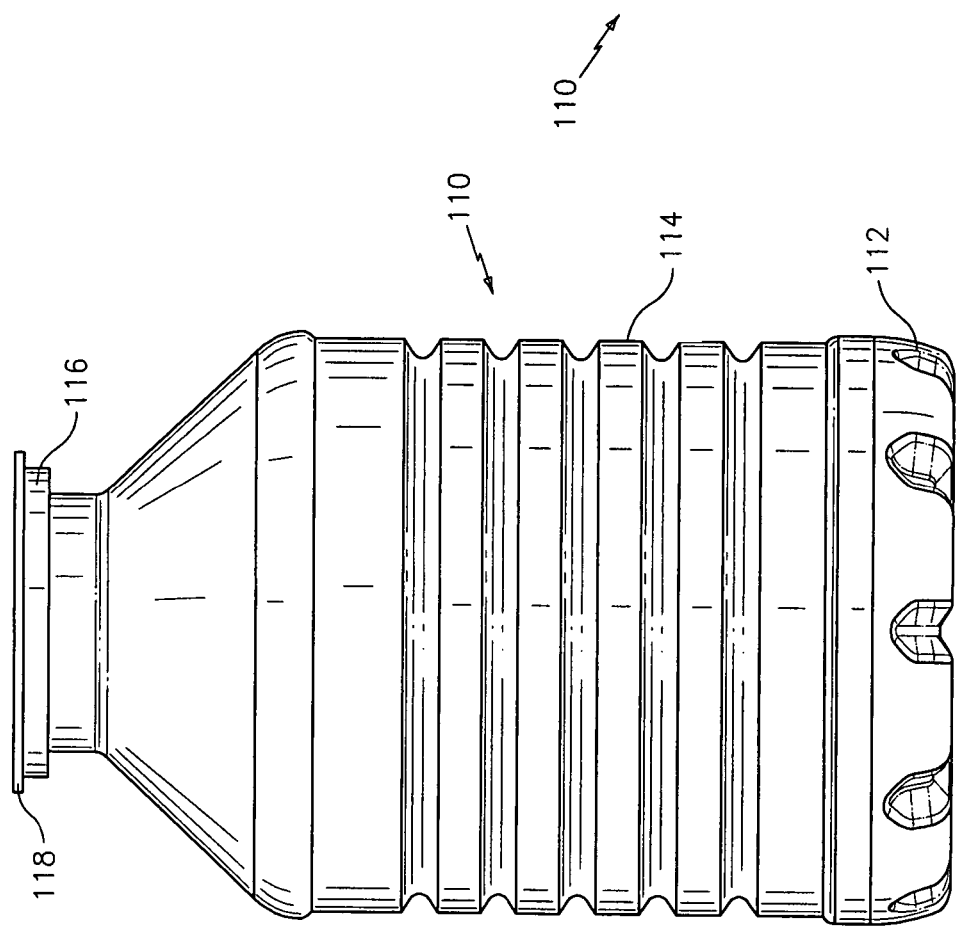
FIG. 5 is a side view of an alternate embodiment of the container of the present invention.

The alternate embodiment of FIGS. 5 and 6 shows a 250 ml juice container, container 110. Similar to FIGS. 1 and 2, container 110 is a blow molded container having a circular base 112, a cylindrical sidewall 114 projecting upwardly from the circular base 112, a neck finish 116 projecting upwardly from the sidewall 114, and having an opening 118 to the inside of the container. The neck finish 116, base 112 and sidewall 114 are similar to that shown in FIGS. 1-3, but the shape of container 110 differs somewhat from the shape of container 10.

In FIG. 2 the opening adjacent the neck finish is covered by a foil covering 54, which can be removed by tab 56. In FIG. 6, the opening adjacent the neck finish is covered by a removable closure 158, which can be reapplied to close a partially emptied container. Alternatively, the container can be closed with both a removable foil and closure.

Figure 7:
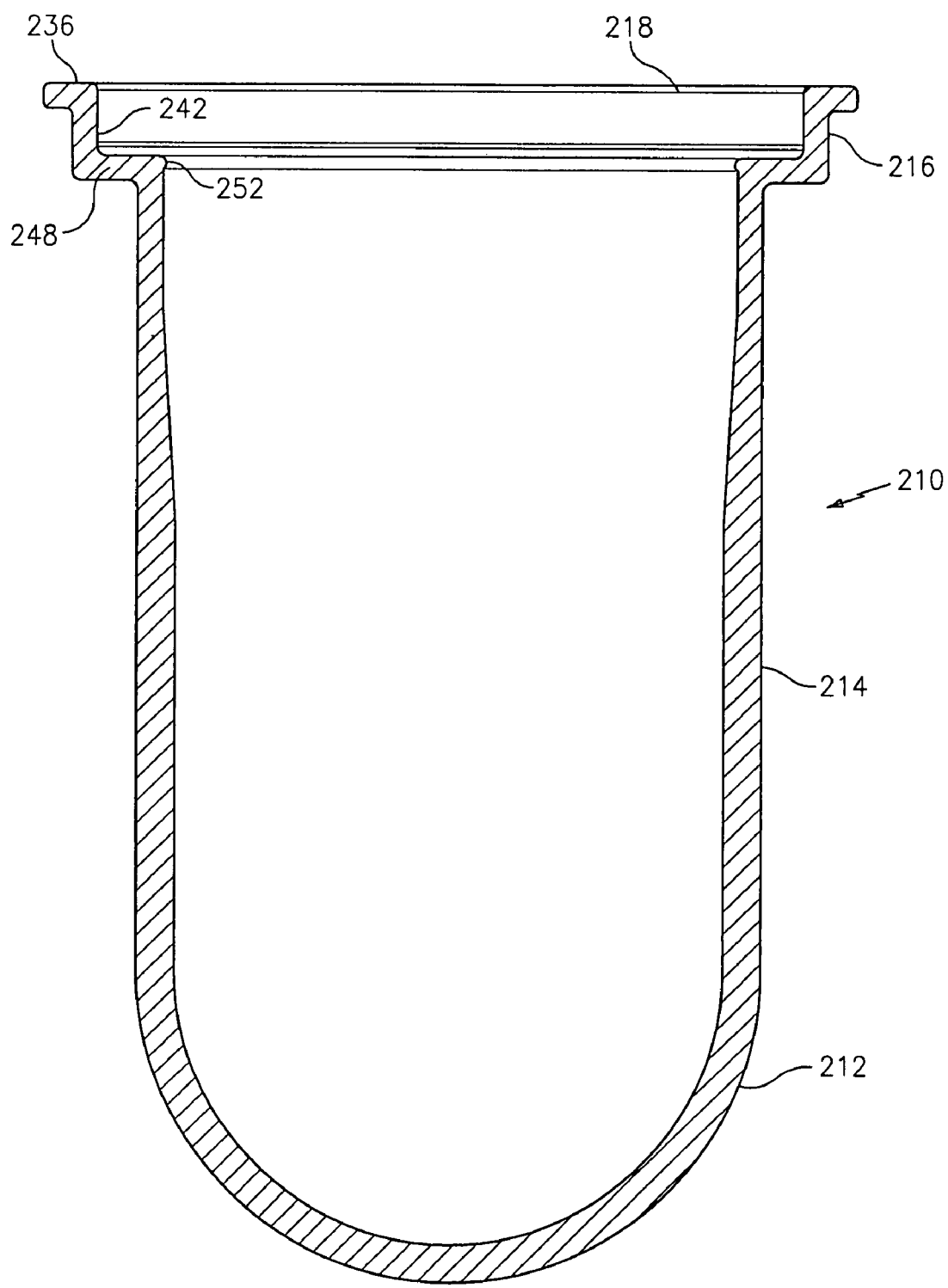
FIG. 7 is a sectional view of the preform of the present invention.

FIG. 7 shows a preform 210 for forming the containers of the present invention. The preform 210 has a base 212 which in cross-section is semi-circular as shown in FIG. 7 and a cylindrical sidewall 214 projecting upwardly from the base. Neck finish 216 projects upwardly from sidewall 214, and has an opening 218 to the inside of the preform. The sidewall 214 is substantially straight, or it may have a slight taper, and is positioned inwardly of the neck finish.

The neck finish 216 in preform 210 is the same as neck finish 16 shown in detail in FIG. 4 for the container, including upper flange 236, downwardly extending flange 242 and lower flange 248 with inward projection 252.

Advantageously, the preform and final container can be prepared with a very thin wall thickness to make a rapid processing cycle. For example, the sidewall of the preform can readily have a wall thickness of from 0.05 to 0.06 inch, which enables a rapid cycle time. Moreover, the weight of the neck finish of the present invention is advantageously less than conventional threaded or snap-on neck finishes.

The present invention provides an advantageous, light weight preform and container, particularly suitable for water, juice and non-carbonated beverages. The neck finish is particularly advantageous as it eliminates traditional threaded or snap on caps which require at least 3 to 4 grams in the neck finish. The neck finish of the present invention will require less than one gram of plastic and can readily use a foil seal and/or a light weight snap on closure.

The neck finish of the present invention, without a thread split for the traditional threaded or snap on closure finishes, will allow about two times the number of cavities in the injection mold with the same mold block size. For example, a 96 cavity mold could go to 192 cavities using the neck finish of the present invention. Also, the injection mold cost will be significantly reduced as conventionally used thread splits represent a complex part to manufacture. For example, typical thread splits cost in the range of U.S. Dollars 1,000 each; whereas, these can be replaced in accordance with the present invention with a stripper ring that would cost less than U.S. Dollars 100.

Another highly advantageous feature of the present invention is that it enables one to remove the intermediate neck finish support flange that is normally employed with conventional preforms and is used as a feature to enable the transfer of preforms into the blow mold and to transfer the blown container out of the blow mold on conventional, high speed PET blow molding machines. With the double stepped, inwardly oriented neck finish of the present invention the finish weight can be significantly reduced and the preforms and containers can still be processed on conventional high speed, two stage blow molding equipment. A transfer gripper can be readily be provided that will grip the preforms and containers of the present invention around the upper flange to accomplish this.

The container of the present invention is particularly suitable as a replacement for the juice box package and the pouch package for child drinks. Costs have always been an obstacle for blow molded containers to compete in this market. The features of the light weight container and preform of the present invention now make it possible to effectively compete in this market. The features of the present invention in the preform include a very thin wall thickness providing a very rapid injection molding cycle time. For example, injection molding cycle times for the preform of the present invention are less than seven seconds. This should be compared to cycle times for traditional preforms of 10 to 15 seconds. Moreover, with the thin wall thickness of the preform the rapid injection molding speeds can be achieved without the use of a robotic take out plate that is used on traditional preform designs. This represents a further cost reduction inherent in the present invention.

A still further advantage of the container of the present invention is that it can be filled on high speed filling equipment at speeds in excess of 1200 containers per minute. Current juice box and pouch packages are limited to 600 containers per minute. Moreover, the light weight finish lowers the center of gravity and provides the container with more stability on high speed filling lines. The combination of these features provides a plastic container, particularly PET, which has a very low weight and which can be filled and handled at very fast filling speeds, all of which provides the consumer with an advantageously low cost package.

In addition, the container of the present invention is fully recyclable. Current juice box and pouches are not recyclable. The present invention, therefore, will provide consumers with an option to purchase an advantageous, recyclable container in the water, juice and non-carbonated beverage market.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A preform for forming a blow molded container, which comprises:
    a base, a cylindrical sidewall projecting upwardly from the base, a neck finish projecting upwardly from the sidewall and having an opening to the inside of the preform;
    wherein the neck finish includes an inwardly oriented stepped area adjacent said opening;
    said stepped area including an upper, outwardly extending flange which borders on the opening, said outwardly extending flange having an outer surface and an inner surface;
    a downwardly extending flange extending downwardly from the inner surface of the outwardly extending flange and essentially perpendicular to the outwardly extending flange, and having an upper portion connected to the inner surface of the outwardly extending flange and a lower portion opposed to the upper portion; and
    a lower inwardly extending flange connected to the lower portion of the downwardly extending flange and extending inwardly of said downwardly extending flange and essentially perpendicular to the downwardly extending flange, wherein the lower inwardly extending flange has an inside surface and an outside surface and the outside surface terminates at the lower portion of the downwardly extending flange.

2. A preform according to claim 1, wherein said upper flange extends outwardly beyond the downwardly extending flange.

3. A preform according to claim 2, wherein the inside surface of the inwardly extending flange includes an inward projection.

4. A preform according to claim 3, wherein said inward projection has an inwardly projecting curved surface.

5. A preform according to claim 3, wherein said inward projection extends inwardly adjacent a downwardly extending wall portion.

6. A preform according to claim 1, wherein the sidewall is substantially straight and extends inwardly of said neck finish.

7. A preform according to claim 6, wherein the sidewall extends downwardly from the neck finish to the base essentially perpendicular to the inwardly extending flange.

8. A preform according to claim 1, wherein in cross-section the base is semicircular.

9. A preform according to claim 1, wherein the upper flange extends essentially perpendicular to the sidewall.

10. A preform according to claim 1, wherein said preform is a monolayer preform.

11. A preform according to claim 1, wherein the downwardly extending flange has an outer surface and an inner surface, and wherein the outer surface extends essentially perpendicular to the upper flange during the entire length of the downwardly extending flange.

12. A preform according to claim 11, wherein the inner surface of the downwardly extending flange extends essentially perpendicular to the upper flange during the entire length of the downwardly extending flange.

13. A preform according to claim 11, wherein the outside surface of the lower inwardly extending flange is connected to the outer surface of the downwardly extending flange in an essentially straight line.

* * * * *